Jan. 9, 1945.　　　　　B. G. BENAWAY　　　　　2,366,693
SELECTOR VALVE
Filed Aug. 26, 1942　　　2 Sheets-Sheet 2

BERNARD G. BENAWAY,
INVENTOR

BY

ATTORNEY

Patented Jan. 9, 1945

2,366,693

UNITED STATES PATENT OFFICE 2,366,693

SELECTOR VALVE

Bernard G. Benaway, Hollywood, Calif., assignor to Aircraft Accessories Corporation, Burbank, Calif., a corporation of California Application August 26, 1942, Serial No. 456,214

9 Claims. (Cl. 277—20)

This invention relates to a selector valve unit for use in controlling a reversibly movable hydraulic motor and is especially adapted for aircraft installation or controlling the operation of a reversibly movable piston connected to adjust the position of landing gears and similar movable parts about an aircraft.

Four-way poppet selector valves are used to apply fluid pressure collectively to move in either direction a reversibly movable hydraulically actuated piston or other reversibly movable element of a hydraulic motor. The valve mechanism is connected to the high pressure side of a hydraulic pump and comprises four valve devices or assemblies, the operation of which is determined by a single controller which may assume a neutral position in which all four valves are closed, a position in which fluid under pressure is applied to one side of the hydraulic piston and the fluid pressure on the other side thereof is relieved by connecting the corresponding end of the hydraulic cylinder to the receiving reservoir on the low pressure side of the hydraulic pump and a third position in which the connections to the hydraulic motor are reversed.

It is an object of this invention to provide a four-way poppet selector valve of the character described, which shall have long life which shall be quiet in operation and which shall perform its functions in a positive and dependable manner.

It is another object of the invention to provide a quick acting selector valve unit to function as just described in which each valve is held in closed position on its valve seat against the pressure of the hydraulic fluid subject to control and has an opening movement away from the valve seat in a direction of the stream flow, the valve being free to move in response to the force of the moving fluid when the valve control mechanism is operated to open the valve, insuring a rapid opening movement of the valves and requiring the application of low power to the controlling mechanism by which the selector valve unit is operated.

It is another object of the invention to provide a quick acting selector valve unit in which the valve element of each valve is a ball which is held in closed position upstream against the valve seat and is opened by a downstream movement away from the valve seat, the force effecting this movement being derived mainly from the hydraulic action of the fluid.

It is another object of the invention to provide a selector valve unit in which the valve seats are cushioned against the impact of the closing valves and in which the valve devices are constructed to afford a resilient sealing pressure between the valve and valve seat when they are in closed position.

It is a further object of the invention to secure the aforesaid cushioning of the valve seats against the impact of the closing valves as the valves move into closing engagement with the valve seats by providing a selector valve unit having valve seats yieldably movable along the flow lines of the fluid stream in fluid sealing relation with the walls of the valve body to a limit position and having valves movable toward said valve seats from an open position into engagement with said valve seats, moving the valve seats from their limit position.

It is a further object of the invention to provide a selector valve unit which is so constructed that the hydraulic action of the fluid is in a direction effective to open the several valves and to provide a fluid pressure seal between the valves and valve seats when the valves are in closed position, the construction of each valve device being characterized by the fact that the valve seat is movable downstream by the hydraulic action of the fluid to a limiting position and the valve is movable between a closed position in which it holds the valve seat above this limiting position against the hydraulic action of the fluid on the valve seat, and an open position in which the valve seat occupies its limiting position and the valve is spaced below the valve seat.

It is another object of the invention to provide a selector valve unit in which cushioning of the valve seats against the impact of the valves and in which a resilient pressure seal between the valve and valve seat when in closed position results from mounting the valve seat in the valve body to be slidably movable upstream against the action of gravity or of a coiled spring, the valve being movable from an open position in which it is spaced below the valve seat upwardly into engagement with the valve seat and thereafter lifting the valve seat a short distance against the action of gravity or a spring.

It is another object of the invention to provide a quick acting selector valve unit in which the valve elements, having downstream opening movements under the action of the hydraulic force of the fluid, are supported in either open or closed position by a movable wall or stop member positioned below the valve.

It is another object of the invention to provide a quick acting selector valve unit having valve elements thus related and supported in which the valve seats are movable along the lines of flow of the fluid and which when in closing engagement with the valves are held upstream by the valves against the hydraulic action of the fluid.

It is another object of the invention to provide a quick acting selector valve unit in which movements of the valves between open and closed position are effected by a transverse movement of cam faced supporting members positioned below the valves, and more specifically by a cam faced shaft rotatable on an axis which lies transverse to the valve axes.

It is another object of the invention to provide a selector valve unit constructed to accomplish the aforesaid objects in which the valve elements are spherical balls.

It is another object of the invention to provide a quick acting selector unit having ball valves in which the balls are held upstream against the hydraulic action of the fluid in both open and closed positions by a cam faced shaft provided with ports and passages connecting the low pressure valve chambers of the unit with a low pressure outlet.

It is another object of this invention to provide a four-way poppet selector valve unit to function as described above in which each of the valve elements in opening drops away from its seat in the direction of the flow of the fluid stream to provide a rapid opening movement and in which the valves are controlled in their movements by a single common shaft having cam faces which supportingly engage the valves from below and being formed with passages for conducting the spent fluid from two of the valve chambers, providing a compact structure, housing quick opening valves which require a minimum of actuating power.

It is another object of this invention to provide a four-way poppet selector valve mechanism having an automatic pressure release means which operates when the valve is in a neutral position to prevent the development of a dangerously high pressure within the valve chambers, the hydraulic motor, and the connecting conduit, due to a rise in the temperature of the hydraulic fluid or from other causes.

It is another object of the invention to provide a valve device which shall have the closure elements related to the valve chamber and to each other in a manner to provide quick, quiet, positive, dependable action with long life and requiring small power for its manipulation.

Further objects and advantages of the invention will be brought out in the following part of the specification.

Referring to the drawings which are for illustrative purposes only,

Figure 1:
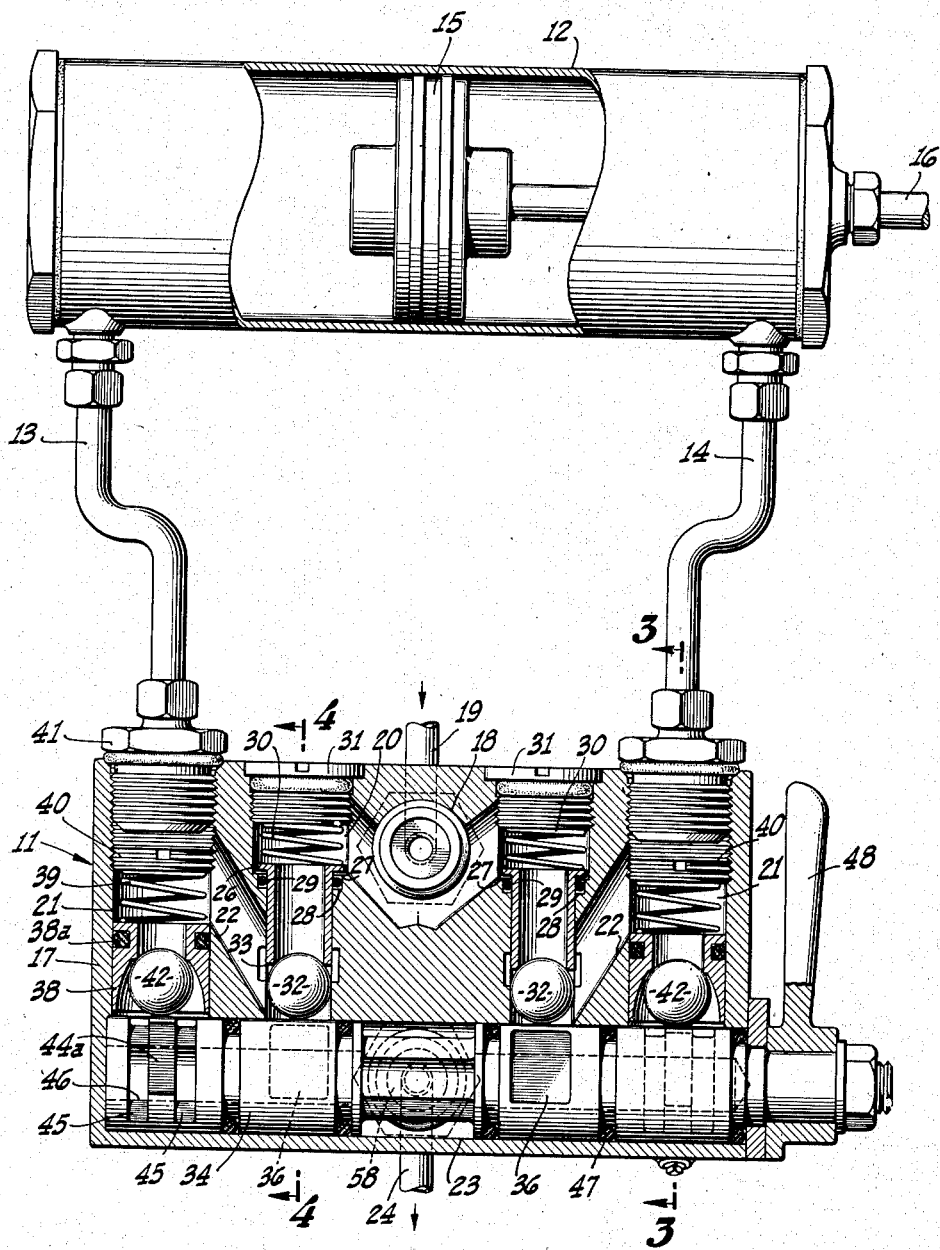
Fig. 1 is a longitudinal sectional view of a fourway poppet selector valve unit embodying this invention shown in utility combination with a hydraulic motor.

In Fig. 1 a four-way poppet selector valve unit 11 is shown connected to a hydraulic cylinder 12 by conduit piping 13 and conduit piping 14 for selectively applying fluid pressure to the leftward and rightward faces of the hydraulic piston 15 to correspondingly move the piston rod 16 which is operatively connected to a landing gear or other aircraft device, the position of which must be adjusted during the operation of the aircraft.

Figure 2:
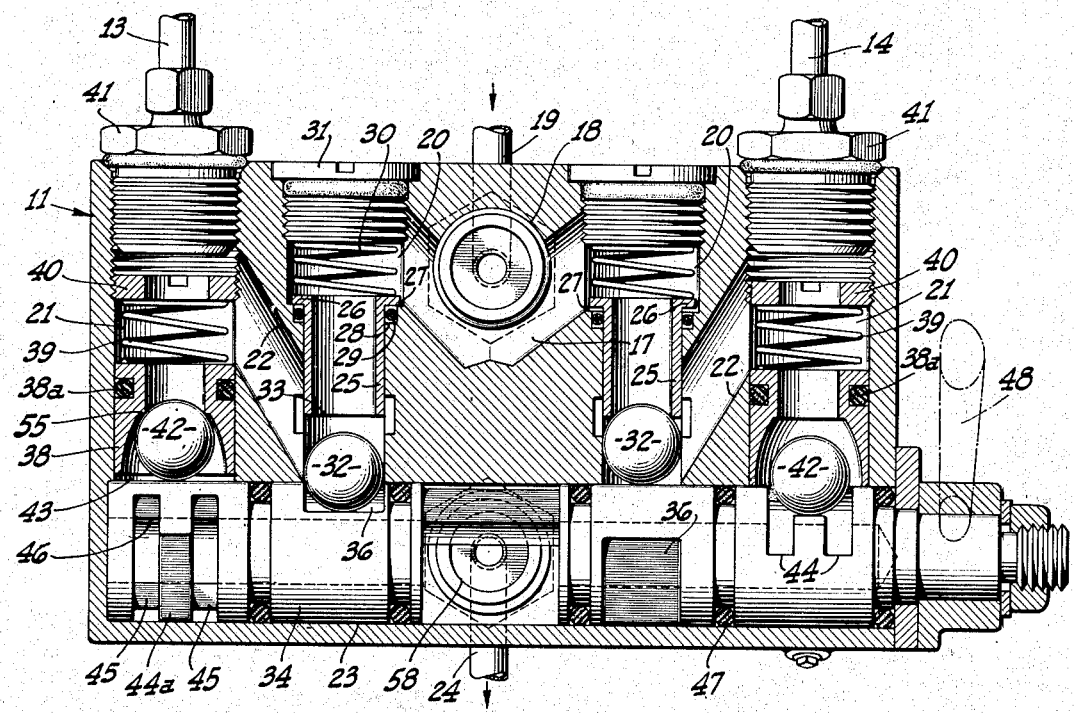
Fig. 2 is an enlarged longitudinal sectional view of the valve mechanism shown in Fig. 1, the valve being shown in position for making fluid connection to apply pressure to operate the hydraulic motor in one direction.

Referring to Figure 2, a housing 17 for the valve unit is a block of metal machined to provide an inlet chamber 18 to which high pressure fluid is delivered by piping 19 from the high pressure side of a hydraulic pump (not shown). The inlet chamber 18 is in communication at its leftward and rightward sides with a pair of high pressure valve chambers 20 respectively. Each of the high pressure chambers 20 is connected to a low pressure valve chamber 21 by a passage 22 leading from the lower end portion of the high pressure chamber to the upper end portion of the low pressure chamber.

The housing 17 is also machined to provide a bore 23 extending through the lower portion of the housing block in communication with the lower end portions of the two valve chambers 20 and the two valve chambers 21. The bore 23 is in communication centrally of the housing with a low pressure piping 24 leading to the accumulator reservoir of the hydraulic pump (not shown).

An inlet or high pressure sleeve 25 is slidably mounted in each of the high pressure valve chambers 20. Each sleeve 25 which constitutes a valve seat member, is formed with an upper terminal annular flange 26 which engages a shoulder 27 in the bore face of each valve chamber 20, the shoulder 27 limiting downward movement of the sleeve 25 in the valve chamber. Three forces act to hold the sleeve 25 downwardly against the shoulder 27, i. e., gravity, the yieldably acting force of a spring 30 seated under compression between the flange 26 and a closure cap 31 threadedly secured in the housing at the upper end of the valve chamber, and the hydraulic force exerted upon the flange 26 by the fluid under pressure within the valve chamber. Leakage of the fluid between the engaging faces of the sleeve 25 and the housing is prevented by the sealing ring 29 resting upon a shoulder 28 provided in the bore surface of the chamber 20.

The valve element of the valve device contained in each valve chamber 20 is a steel ball 32 diametered to move freely within the valve chamber 20, which when in contactual engagement with a valve seat edge 33 at the lower end of the valve seat sleeve 25 shuts off the flow of hydraulic fluid through the valve chamber and when spaced below the valve seat edge 33 permits flow of hydraulic fluid through the valve chamber.

Figure 4:
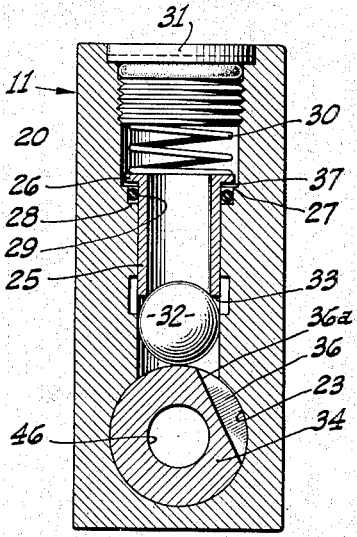
Fig. 4 is an enlarged sectional view taken on the line 4—4 of Fig. 1.

The steel ball 32 is supported in engagement with its corresponding valve seat 25 upon the cylindrical peripheral surface of a shaft 34 shown in Figs. 1 and 4 and at the right central portion of Fig. 2. The shaft 34 is rotatably fitted in the housing bore 23 and it may be turned from a neutral position as shown in Fig. 1 through a small arc in either direction by means of a handle 48 secured to an end of the shaft which projects from the housing.

The shaft 34 is formed with two segmental slots 36 aligned with the valve chambers 20 respectively. The length of these slots longitudinally of the shaft is such that the ball 32 may roll from the cylindrical peripheral surface of the shaft on to the bottom face 36a of the slot when the shaft 34 is turned to bring the slot opposite the corresponding valve chamber 20. When the handle 48 is turned to the left in an anticlockwise direction the leftward slot 36 moves into registry with the leftward valve chamber 20. When the handle 48 is turned to the right from the neutral position shown in Fig. 1 the rightward slot 36 is moved into registry with the rightward valve chamber 20. When the handle 48 is in the neutral position, both of the balls 32 are supported at their uppermost position upon the cylindrical peripheral surface of the shaft 34. The bottom walls 36a of the slot 36 act as cam faces to move the balls 32 longitudinally of their valve chambers 20.

As the leftward valve ball 32 is moved upwardly by a rightward movement of the handle 48 to its neutral position, the ball moves from the position shown in Fig. 2 to that shown in Fig. 4. Just prior to reaching the position shown in Fig. 4, the ball engages the annular edge 33 of the valve seat sleeve 25 and thereafter lifts the sleeve 25 raising the flange 26 from the shoulder 27 to provide a small clearance 37 as best shown in Fig. 4. Upward movement of the valve seat sleeve 25 is opposed by gravity, by the spring 30 and by hydraulic pressure of the fluid in the valve chamber upon the upper horizontal face of the flange 26. Because the valve seat sleeve 25 is thus yieldably moved upwardly by the ball 32, the impact of the ball upon the annular edge 33 is softened, decreasing wear of the ball and the edge 33, deadening the noise of impact and providing an effective pressure seal between the ball and the valve seat.

When the handle 48 is turned to the left in an anticlockwise direction from its neutral position, the leftward ball 32 rolls on to the cam face 36a and moves downwardly into the segmental slot 36, the valve seat sleeve 25 stopping at a downstream limiting position in which the flange 26 rests upon the shoulder 27 and the ball thereafter moves downwardly away from the valve seat edge 33, permitting flow of fluid from the upper portion of the valve chamber 20 into the lower end portion thereof and into the passage 22 from which it flows into the upper end portion of the leftward low pressure valve chamber 21. The downward movement of the ball 32 results in part from gravity but the major force effecting this downward movement is the hydraulic action of the fluid pressing downwardly upon the ball and flowing from the valve chamber 20 into passageway 22.

While the valve mechanism is preferably disposed as shown in the drawings with the valve chambers in vertical position and the valve balls at the lower ends of the valve chamber, the opening and closing of the valves is successfully accomplished with the housing in any other position, such as a horizontal position or an inverted position with the balls at the top of the valve chambers. If the position is such that gravity is ineffective to cause downward movement of the balls away from their valve seats, the pressure of fluid within the valve chambers or the hydraulic action of the moving fluid will insure a prompt and rapid opening movement of the valve balls. It is also apparent that since the peripheral and cam faces of the shaft 34 act only as downstream supports for the valve balls, abutting the balls from below, the shaft 34 is readily moved from one position to the other with small expenditure of energy, the energy required for opening the valves being supplied for the most part by the hydraulic fluid. It is further evident that since the valve element is a spherical ball which rolls upon smooth extended supporting surface, the valve is positive and certain in its operation without the possibility of sticking at any one position during its movement, a possibility which is characteristic of valves having valve stems slidable in valve stem guides.

The valve devices of the low pressure valve chambers 21 are very similar to the valve devices in the valve chambers 20 which have just been described. The valve seat element is a sleeve 38 longitudinally slidable within the valve chambers 21, the engaging surfaces of the sleeve and chamber being sealed against leakage of fluid by a sealing ring 38a. Downstream movement of the valve sleeve 38 is limited at that position at which the lower end of the valve seat contacts the adjacent cylindrical peripheral surface of the shaft 34. Upward movement of the valve sleeve 38 is yieldably resisted by gravity, by a compression coiled spring 39 seated between the valve sleeve and a retainer nut 40 threaded in the upper portion of the valve chamber 21, and by the hydraulic force applied to the upper horizontal face of the valve sleeve by the fluid within the valve chamber 21.

The valve element of each valve device in the low pressure chamber 21 is a steel ball 42 which engages an annular valve seat edge 55 formed on the valve sleeve 38 and which has rolling contact with the shaft 34 beneath it. When the handle 48 is in neutral position the valve ball 42 rests upon a cylindrical peripheral surface of the shaft 34 holding the valve sleeve 38 with its lower end spaced a short clearance distance 43 above the shaft 34, as shown at the leftward end of Fig. 2 and in Fig. 3, a tight pressure seal being effected between the ball 42 and the valve seat 38 by the action of gravity, the action of the spring 39 and the hydraulic action of the fluid in the chamber 21.

When the handle 48 is turned rightward in a clockwise direction the ball 42 of the leftward low pressure valve device enters a segmental slot 44 formed in the shaft 34 and rolls upon a bottom face 44a of the slot 44, first lowering the valve seat sleeve 38 to its lowermost position, in contact with the shaft 34 and then dropping away from the valve seat edge 55 to permit flow of fluid between the ball and valve seat. Return of the hydraulic fluid from the lower end of valve chamber 21 to the low pressure side of the hydraulic pump is accomplished as follows.

The shaft 34 is bored to provide a central cylindrical bore chamber 46 extending from the leftward end of the shaft to a point near its rightward end and to the right of the rightward low pressure valve chamber. Opposite each of the low pressure chambers 21, the shaft 34 is formed with two spaced segmental slots 45 extending inwardly from the segmental slot 44 providing passage chambers communicating with the slot 44 and sufficiently deep to communicate with the bore chamber 46 of the shaft 34. From an inspection of Fig. 3 it can be seen that the slots 45 and the slot 44 constitute port passageways connecting the lower ends of low pressure chambers 21 with the shaft bore chamber 46 in whatever one of its three positions is occupied by the shaft 34. Consequently when either of the balls 42 is in open position spent fluid from the corresponding low pressure valve chamber 21 flows from the lower end of the valve chamber through the slots 45 into the bore chamber 46. A central section of the shaft 34 is cut away except for a truncated sector shaped neck to provide a communicating connection between the bore chamber 46 and a radial passageway 58 in the housing which connects the housing bore 23 with the return piping 24. When the handle 48 is moved either to the right or to the left, fluid flows from either the leftward low pressure chamber 21 or the rightward low pressure chamber 21 as the case may be through the corresponding slots 45, bore chamber 46 into the passageway 58 and back to the low pressure side of the hydraulic pump through the piping 24. Sealing rings 47 disposed in channel shaped annular grooves along the shaft between each pair of adjacent valve chambers and at the rightward end of the shaft prevent leakage of fluid between the valve chambers and from the rigntward low pressure valve chambers to the exterior of the housing.

The upper end of the leftward low pressure chamber 21 is provided with a closure cap 41 threaded into the valve chamber and centrally apertured for connection to the piping 13 leading to the leftward end of the hydraulic motor cylinder 12 (Fig. 1). The rightward low pressure chamber 21 is similarly connected to the right end of the cylinder 12. The cam slots 36 and 44 on the shaft 34 are so angularly related to each other and to the handle 48 that when the handle 48 is in its central neutral position, all four of the steel valve balls 32 and 42 are in closing engagement with their corresponding valve seat as shown in Fig. 1. When the handle is turned to the left, the leftward high pressure valve device is open and the rightward low pressure valve device is open, the leftward low pressure valve and the rightward high pressure valve remaining closed. As can be readily traced from Fig. 2 of the drawings, high pressure fluid then flows to the leftward end of cylinder 12 moving the piston 15 to the right. Rightward movement of the piston is permitted by a flow of low pressure fluid from the rightward end of the cylinder 12 through the piping 14 and rightward low pressure valve chamber 21 into the bore chamber 46 and thence to the return piping 24. In a corresponding manner rightward movement of the handle 48 from its central neutral position sets up the fluid pressure conditions which move the piston 15 to the left.

Figure 3:
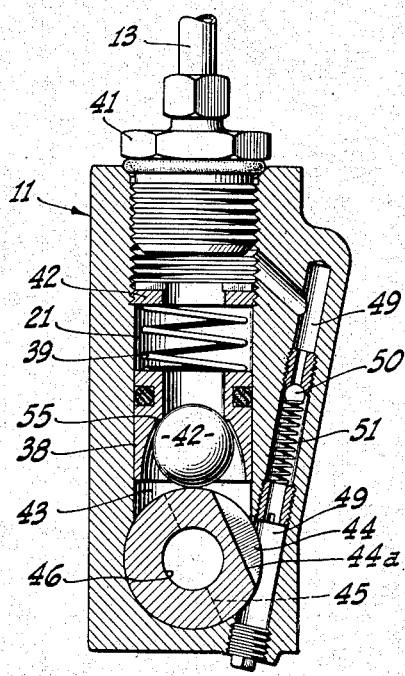
Fig. 3 is an enlarged sectional view taken on the line 3—3 of Fig. 1.

When all four valves are in closed position, as shown in Fig. 1, a closed fluid circuit condition obtains in the hydraulic cylinder 12 the connecting piping 13 and 14 and the low pressure valve chambers 21. To provide pressure relief for this closed circuit under conditions when the pressure in the closed circuit becomes excessive due to a rise in temperature in the cylinder 12 or to other conditions, each low pressure valve chamber is provided with a relief passageway 49 as shown in Fig. 3. The passageway 49 connects the upper ends of the low pressure valve chambers 21 with the segmental port slots 45 in the shaft 34 and is provided with a downstream opening valve ball 50 which is normally held in seated position by a spring 51 adjusted to hold the ball 50 seated against normal operating pressures existing in the valve chamber 21 but yieldable to excessive pressures which may cause leakage in the closed circuit or which may damage the valve mechanism or the hydraulic motor.

I claim as my invention:

1. In a selector valve unit, the combination of: a valve body having a high pressure inlet port, a service port, a low pressure outlet port, a passage connecting said inlet port and said service port and a passage connecting said service port and said outlet port; a valve means in each of said passages, at least one of said valve means comprising a first member and a second member cooperatively engaging to close said passage, said first member being movable along the flow lines of said passage and subject to the action thereon of the downstream force exerted by the fluid in said passage; means for yieldably applying a downstream force to said first member; stop means limiting the downstream movement of said first member, said second member being movable downstream away from engagement with said first member to open said passageway; and selectively operable means for moving said second member from open position into engagement with said first member and for further moving said members while cooperatively engaged in an upstream direction a limited distance against the action of said downstream force and of said force applying means, and cooperatively opening said other valve means, and being further operable to permit downstream receding movement of said second member into open position and cooperatively closing said other valve means.

2. In a selector valve unit, the combination of: a valve body having a high pressure inlet port, a service port, a low pressure outlet port, a first passage connecting said inlet port and said service port and a second passage connecting said service port and said outlet port; a first valve means in said first passage; a second valve means in said second passage, said second valve means comprising a downstream facing ball valve seat slidably movable in said second passage in fluid tight relation with the walls of said second passage and a ball valve for said valve seat, said ball valve being movable downstream from said valve seat to open said second passage; a coiled spring mounted in said second passage to yieldably move said seat downstream; a shaft arranged transversely of the direction of movement of said ball valve, the cylindrical surface of said shaft limiting downstream movement of said seat and supporting said ball valve and seat in engaged position with said valve seat spaced a limited distance upstream from said shaft and said shaft having a transversely slotted cam face arranged to permit said ball to follow said cam face downstream in a movement permitting said seat to move into contact with said shaft and carrying said ball away from said valve seat under the action of the downstream force exerted by the fluid in said second passage; and selective means for rotatively moving said shaft either to support said ball valve in said engaged position and cooperatively open said first valve means or permit said ball valve to move away from said seat and cooperatively close said first valve means.

3. The combination defined in claim 2 in which said shaft has a bore communicating with said outlet port and has a radial fluid passage connecting said valve passage and said bore.

4. In a valve mechanism, the combination of: a valve body providing four laterally aligned valve chambers, a high pressure inlet port connected to the upstream ends of the middle two of said valve chambers, a passageway connecting each of the downstream end portions of said middle two chambers with the upstream end portions of the adjacent outside chambers, a service port at the upstream end of each outside chamber and a transversely disposed bore communicating with the downstream end portions of all four of said chambers; a hollow bored shaft rotatively fitted in said bore, said body having a discharge low pressure port and said bore of said shaft being in communication with said discharge port; a downstream facing valve seat between the end portions of each of said chambers; a valve closure for each of said seats, said balls being supported simultaneously against downstream movement away from said seats by said shaft when said shaft is in a neutral angular position; two radially aligned closure supporting cam faces on said shaft for permitting simultaneous downstream movement away from the valve seats of the valve closures in one of the outside chambers and the middle chamber which is adjacent to the other one of said outside chambers upon an angular movement of said shaft in one direction from said neutral position; two radially aligned closure supporting cam faces on said shaft for permitting downstream movement simultaneously of the valve closures in the other outside chamber and other middle chamber upon an oppositely directed angular movement of said shaft from said neutral position, said shaft having a passage for connecting said low pressure port with the inner portion of each of said outside chambers; and means for selectively adjusting the angular position of said shaft.

5. The combination defined in claim 4 in which said valve seats are movable along lines of fluid flow in said chambers, and in addition thereto: stop means on said valve body for limiting downstream movement of each valve seat of said middle chamber, said shaft limiting downstream movement of each valve seat of said outside chamber, the limit position of each of said four valve seats being between that occupied by said valve seat when said closure is supported by said shaft in raised position and that occupied by said valve seat when said closure is supported in lowered position by its corresponding cam face.

6. The combination defined in claim 4 in which said body is formed with a bypassage at each end thereof connecting the upstream end portion of the adjacent outside chambers with the corresponding shaft passage when said shaft is in the neutral position, and in addition thereto: a downstream opening check valve in each of said bypassages adjusted to open in response to excessive fluid pressure.

7. In a valve mechanism, the combination of: a valve body having a shaft bore, a first bore extending outward from said shaft bore, a second bore extending outward from said shaft bore, a port connecting the exterior of said body with the outer end of said first bore, a passage connecting the inner end of said first bore with the outer end of said second bore, and a second port for connecting the exterior of said valve body with the inner end of said second bore, there being means to close the outer ends of said first and second bores, and a service port connecting the outer end of said second bore with the exterior of said valve body; first and second tubular valve members slidable in said first and second bores between the inner and outer ends thereof, each of said valve members having an inwardly faced valve seat; means to urge said valve members toward said shaft bore; means for limiting the movement of said valve members toward said shaft bore beyond an intermediate position; first and second valve closures respectively at the inner ends of said first and second tubular valve members; shaft means in said shaft bore rotatable between neutral, first, and second positions, said shaft means having parts operative when said shaft means is rotated into said neutral position to lift said first and second closures into engagement with said valve seats and raise said valve members from said intermediate position thereof, and to independently enable said first and second closures to drop away from said first and second valve seats as said shaft means is moved into said first and second positions thereof; and means to seal around said tubular valve members in said first and second bores.

8. In a selector valve unit, the combination of: a valve body having a high pressure inlet port, a service port, a low pressure outlet port, a passage connecting said inlet port and service port, a passage connecting said service port and said outlet port; a valve means in each of said passages, at least one of said valve means comprising a downstream facing valve seat in said passage and a valve for said seat disposed in downstream relation to said seat; a downstream actuator for said valve, said actuator being movable between a first position in which said valve is held in closed position on said valve seat and a second position in which said valve is moved in downstream direction so as to be in open relation to said seat; and selective means for either moving said actuator to said first position and cooperatively opening valve means in another of said passages or moving said actuator to said second position so that said valve may recede from said seat and the pressure of fluid in said inlet port and cooperatively closing said second valve means.

9. In a selector valve unit, the combination of: a valve body having a high pressure inlet port, a service port, a low pressure outlet port, a passage connecting said inlet port and said service port and a passage connecting said service port and said outlet port; a valve means in each of said passages, at least one of said valve means comprising an upstream valve part and a downstream valve part, one of said valve parts comprising a closure and the other of said valve parts comprising a tube having a seat facing said closure, said tube being slidably movable in said passage in fluid tight relation with the walls of said passage; stop means limting downstream movement of said upstream valve part; means for yieldably applying a downstream force to said upstream valve part; a movable support for said downstream valve part disposed downstream from said downstream valve part and operable to permit movement of said downstream valve part to and from engagement with said upstream valve part and while said valve means is under the action of fluid pressure admitted through said inlet port; and selective means for moving said support to permit movement of said downstream valve part either to or from said upstream valve part and simultaneously either open or close said valve means in another of said passages respectively.

BERNARD G. BENAWAY.